US012670264B2

(12) United States Patent (10) Patent No.: US 12,670,264 B2
Stocks et al. (45) Date of Patent: *Jun. 30, 2026

(54) MULTI-COMPUTER SYSTEM FOR PERFORMING VULNERABILITY ANALYSIS AND ALERT GENERATION

(71) Applicant: Bank of America Corporation, Charlotte, NC (US)

(72) Inventors: Dustin Paul Stocks, Stallings, NC (US); Kayla Ashley Rux, Charlotte, NC (US); Viswanathan Venkatasubramanian, Arlington, TX (US); Ramkumar Korlepara, McKinney, TX (US); Sanjay Lohar, Charlotte, NC (US); Eric Eugene Sifford, Harrisburg, NC (US); Ashley L. Jones, Washington, DC (US); David Cuka, West Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 69 days.

This patent is subject to a terminal disclaimer.

(21) Appl. No.: 18/962,031

(22) Filed: Nov. 27, 2024

(65) Prior Publication Data

US 2025/0094599 A1 Mar. 20, 2025

Related U.S. Application Data

(63) Continuation of application No. 17/847,805, filed on Jun. 23, 2022, now Pat. No. 12,197,587.

(51) Int. Cl.
*G06F 21/57* (2013.01)
*G06F 40/20* (2020.01)
*G06N 20/00* (2019.01)

(52) U.S. Cl.
CPC ............ *G06F 21/577* (2013.01); *G06F 40/20* (2020.01); *G06N 20/00* (2019.01)

(58) Field of Classification Search
CPC ........ G06F 21/577; G06F 40/20; G06N 20/00
(Continued)

(56) References Cited

U.S. PATENT DOCUMENTS 9,317,692 B2 4/2016 Elder et al.
9,503,470 B2 * 11/2016 Gertner ............... H04L 63/1425
(Continued)

FOREIGN PATENT DOCUMENTS

CN 105190548 A 12/2015

OTHER PUBLICATIONS

"SBOM at a Glance", NTIA Multistakeholder Process on Software Component Transparency, Apr. 27, 2021, downloaded from <https://www/ntia.gov/files/ntia/publications/sbom_at_a_glance_apr2021.pdf>.

*Primary Examiner* — Thanh T Le
(74) *Attorney, Agent, or Firm* — Banner & Witcoff, Ltd.

(57) ABSTRACT

Arrangements for providing software vulnerability analysis and monitoring are provided. In some aspects, software bill of materials (SBOM) data may be received and software attributes may be extracted from the SBOM data. Author data may be received and analyzed using natural language processing and/or machine learning to identify author attributes. Current event or vulnerability data may be received. In some examples, one or more machine learning models may be executed to determine a confidence score associated with the software being analyzed. For instance, software attributes, author attributes, and current event data may be used as inputs in the machine learning model and a confidence score may be output. Based on the confidence score, (Continued)

one or more alerts may be generated and transmitted to one or more enterprise organization computing devices.

20 Claims, 10 Drawing Sheets

(58) Field of Classification Search
USPC ............................................................ 726/22
See application file for complete search history.

(56) References Cited

U.S. PATENT DOCUMENTS

| | | | |
|---|---|---|---|
| 9,934,384 | B2 | 4/2018 | Johansson et al. |
| 10,810,678 | B2 | 10/2020 | Price |
| 11,030,327 | B2 | 6/2021 | Brannon |
| 12,205,059 | B1* | 1/2025 | Lin .......................... H04L 63/20 |
| 12,265,627 | B1* | 4/2025 | Wood ..................... G06F 21/565 |
| 2011/0167117 | A1* | 7/2011 | Hart ....................... H04L 51/046 |
| | | | 709/204 |
| 2013/0097659 | A1* | 4/2013 | Das .......................... G06F 21/51 |
| | | | 726/1 |
| 2014/0006418 | A1* | 1/2014 | Forte .................... G06F 16/9535 |
| | | | 707/748 |
| 2016/0112451 | A1* | 4/2016 | Jevans ..................... G06F 21/56 |
| | | | 726/25 |
| 2020/0320208 | A1* | 10/2020 | Bhosale ................. G06F 21/577 |
| 2021/0023454 | A1* | 1/2021 | Malan ...................... A63F 13/73 |
| 2021/0216643 | A1* | 7/2021 | Mishra ....................... G06F 8/61 |
| 2021/0264031 | A1* | 8/2021 | Dhillon ................. G06F 21/577 |
| 2021/0326239 | A1* | 10/2021 | Vaughan ................... G06F 8/77 |
| 2022/0083652 | A1* | 3/2022 | Ransford ............. G06F 21/552 |
| 2023/0195882 | A1* | 6/2023 | Cherp ..................... G06F 21/53 |
| | | | 726/1 |
| 2023/0205892 | A1* | 6/2023 | Wareus ................. G06F 21/577 |
| | | | 726/25 |
| 2023/0208880 | A1* | 6/2023 | Schutt ................... G06F 21/566 |
| | | | 726/1 |
| 2023/0367881 | A1* | 11/2023 | Bussell ...................... G06F 8/72 |
| 2023/0367882 | A1* | 11/2023 | Bussell ................. G06F 21/577 |
| 2023/0367883 | A1* | 11/2023 | Bussell ................. G06F 21/577 |
| 2023/0388292 | A1* | 11/2023 | Berko ................... H04L 63/102 |
| 2024/0104652 | A1* | 3/2024 | Sabharwal ............. G06Q 40/04 |

* cited by examiner

110

111

112

Software Analysis Computing Platform

Processor(s)

Memory(s)

SBOM Analysis Module
112a

Author Data Analysis Module
112b

Current Data Analysis Module
112c

Machine Learning Engine
112d

Notification Generation Module
112e

Database
112f

113

Communication Interface(s)

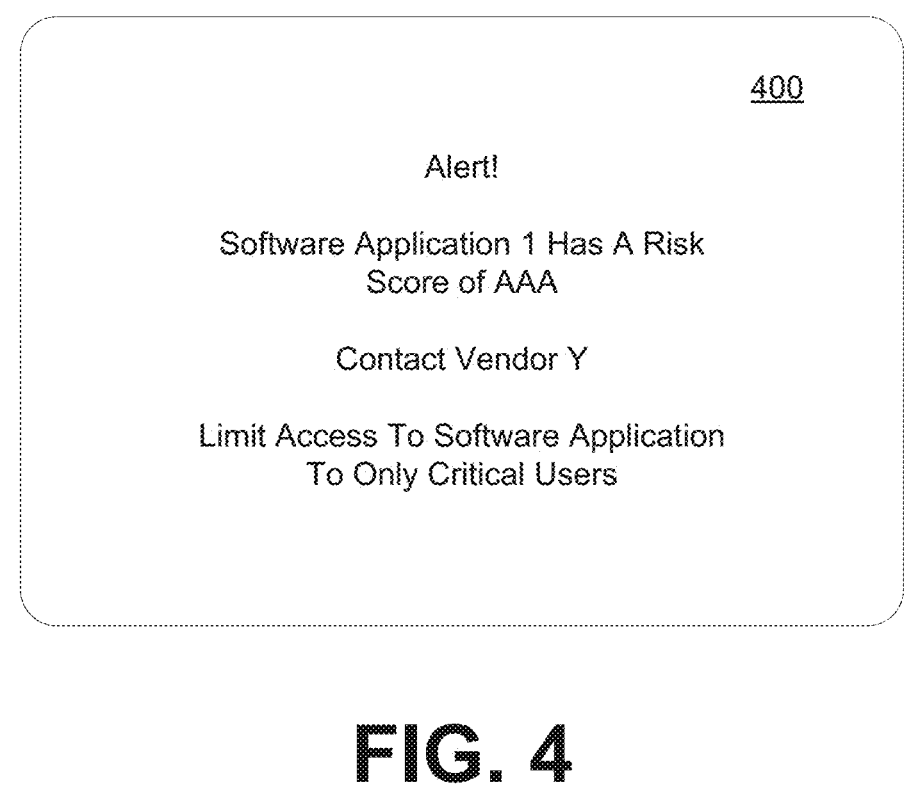

400

Alert!

Software Application 1 Has A Risk
Score of AAA

Contact Vendor Y

Limit Access To Software Application
To Only Critical Users

FIG. 4

MULTI-COMPUTER SYSTEM FOR PERFORMING VULNERABILITY ANALYSIS AND ALERT GENERATION

CROSS REFERENCE TO RELATED APPLICATIONS

This application is a continuation of and claims priority to co-pending U.S. application Ser. No. 17/847,805, filed Jun. 23, 2022, and entitled, "Multi-Computer System for Performing Vulnerability Analysis and Alert Generation," which is incorporated herein by reference in its entirety.

BACKGROUND

Aspects of the disclosure relate to electrical computers, systems, and devices for providing vulnerability analysis and monitoring of software products.

Enterprise organizations often rely on open source software and vendor software to run various aspects of day-to-day operations. However, it is increasingly difficult to fully understand the components of various software products and the risks posed based on, for instance, origin of one or more components of the product. Accordingly, it would be advantageous to access data related to software attributes and author attributes on a continuous basis to continuously evaluate software and mitigate risk.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with monitoring and analyzing software vulnerabilities.

In some aspects, software bill of materials (SBOM) data may be received. The SBOM data may include data associated with one or more software products, applications, or components. In some examples, software attributes may be extracted from the SBOM data. Based on the extracted data, author data may be received. In some examples, author data may be received from one or more sources. The author data may be analyzed using natural language processing and/or machine learning to identify author attributes.

In some examples, one or more machine learning models may be executed to determine a confidence score associated with the software being analyzed. For instance, software attributes and author attributes may be used as inputs in the machine learning model and a confidence score may be output.

Based on the confidence score, one or more alerts may be generated and transmitted to one or more enterprise organization computing devices. In some examples, transmitting the one or more alerts may cause the one or more alerts to be displayed by a display of a respective enterprise organization computing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 4 illustrates one example notification that may be generated in accordance with one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, understanding risk associated with software applications, products, components, or the like can be difficult for enterprise organizations that employ a large number of open source and vendor software products. Further, it may be difficult to correlate a source of software to current events to understand changing risk on a real-time or near real-time basis. Accordingly, aspects described herein are directed to evaluating software attributes, author attributes and current events to understand risk associated with software applications, products or components.

As discussed more fully herein, software bill of materials (SBOM) data may be received and software attributes may be extracted. Further, author data may be received and analyzed using, for instance, natural language processing, machine learning, or the like. Author attributes may be determined or identified based on the analysis. In some examples, current event data (e.g., issues in one or more global regions that may indicate risk, current software vulnerability data, and the like) may be received. The software attributes, author attributes and current event data may be used as inputs into one or more machine learning models that may output a confidence score associated with a likelihood of risk. In some examples, an alert or notification may be generated and transmitted to one or more computing devices for display. In some arrangements, the alert may include an indication of one or more actions to mitigate risk.

Accordingly, aspects described herein may be used to evaluate software before it is implemented, as well as software already in use by the enterprise organization, on a continuous or scheduled basis.

These and various other arrangements will be discussed more fully below.

Figure 1A:
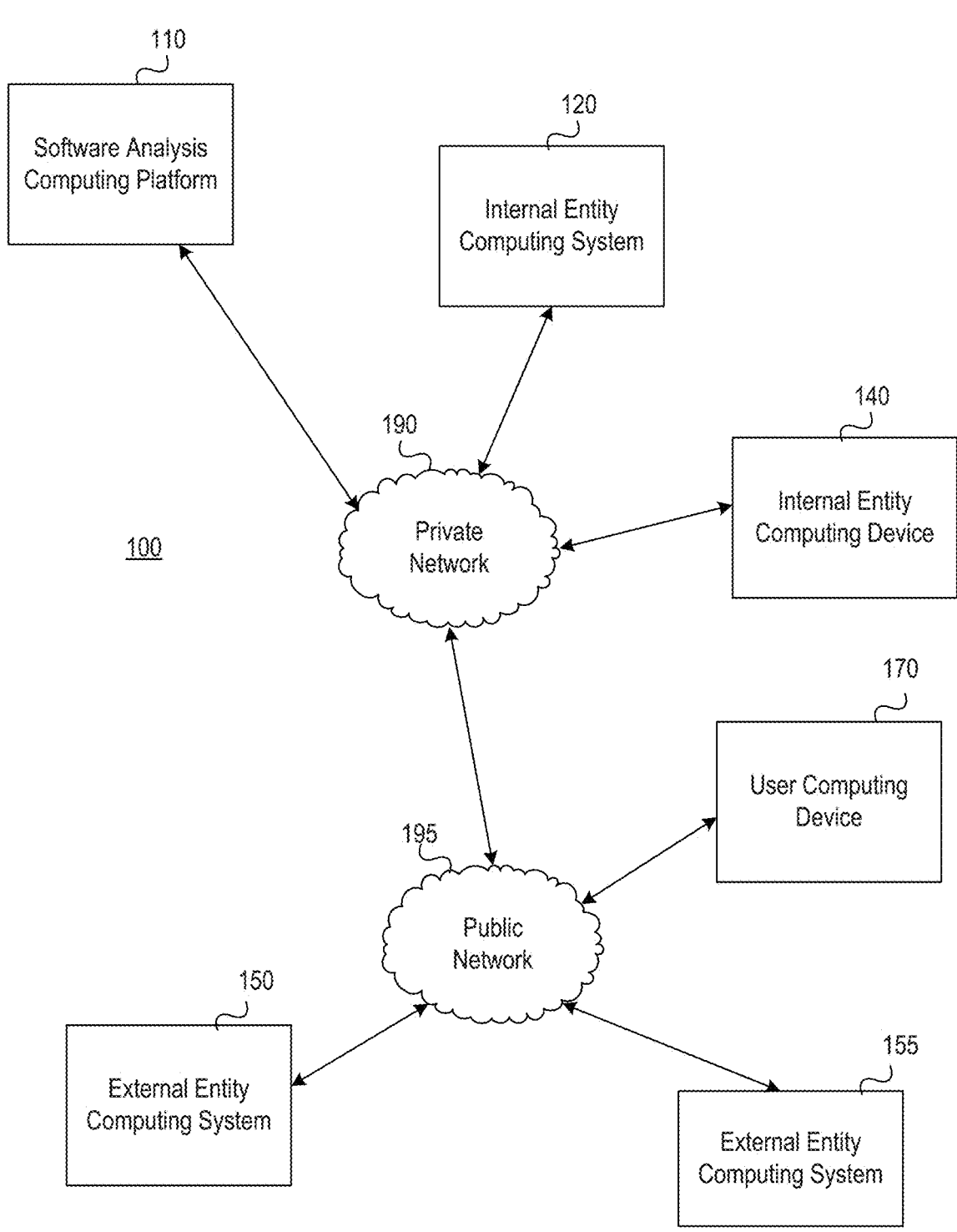
FIGS. 1A and 1B depict an illustrative computing environment for implementing software monitoring and analysis functions in accordance with one or more aspects described herein.
Figure 1B:
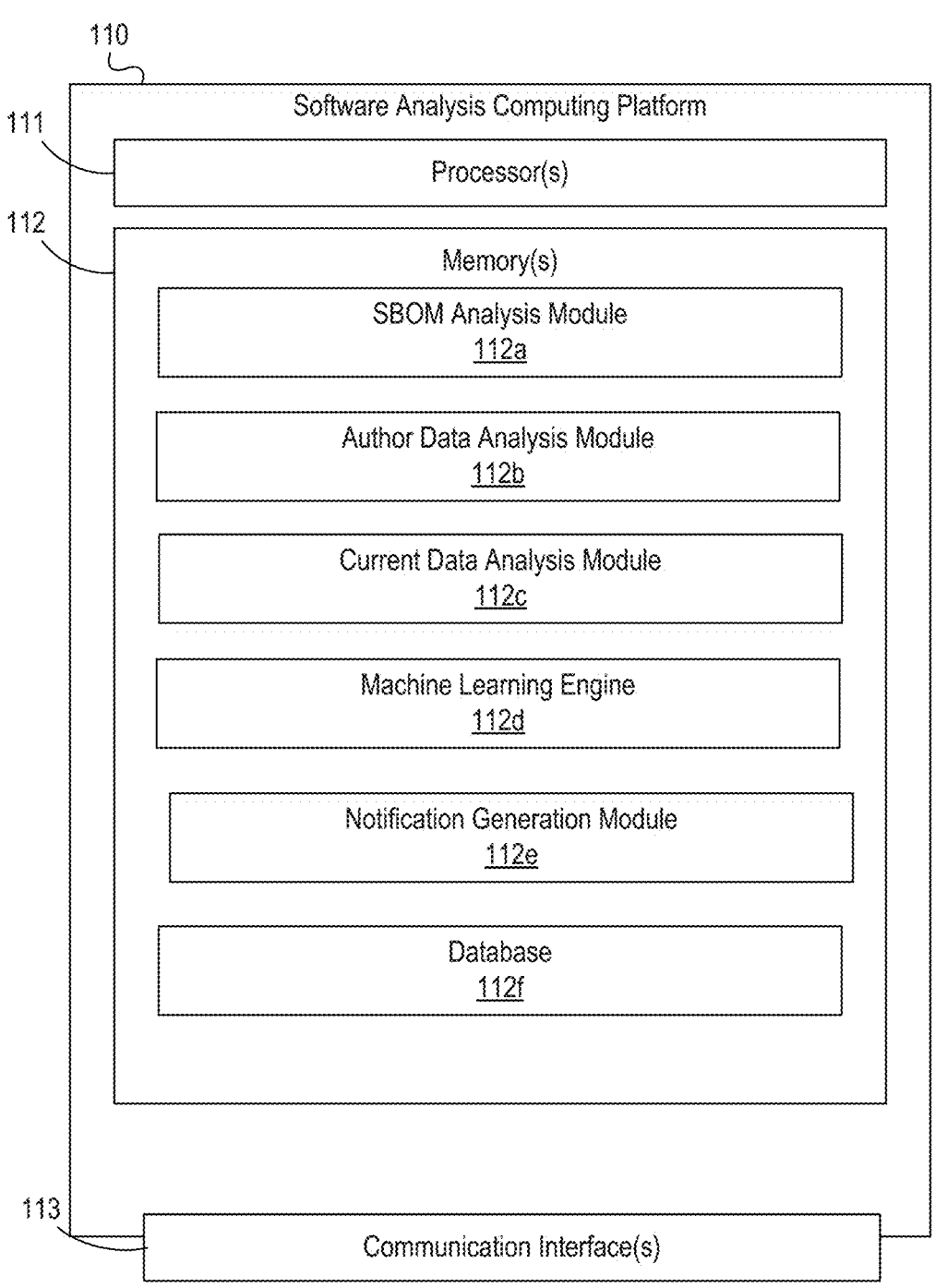

FIGS. 1A-1B depict an illustrative computing environment for implementing software vulnerability analysis and control functions in accordance with one or more aspects described herein. Referring to FIG. 1A, computing environment 100 may include one or more computing devices and/or other computing systems. For example, computing environment 100 may include software analysis computing platform 110, internal entity computing system 120, internal entity computing device 140, external entity computing system 150, external entity computing system 1550, and/or user computing device 170. Although one internal entity computing system 120, one internal entity computing device 140, two external entity computing systems 150, 155, and one user computing device 170 are shown, any number of systems or devices may be used without departing from the invention.

Software analysis control computing platform 110 may be configured to perform intelligent, dynamic, continuous and efficient software vulnerability analysis. For instance, software analysis computing platform 110 may receive software bill of materials (SBOM) data for each application or piece of software used by an enterprise organization. In some examples, the software may be open source software. Additionally or alternatively, the software may be software developed internally by the enterprise organization that may include one or more open source, third-party, or the like component. Further, software products may include vendor generated software products that may, in some examples, include open source components.

The software bill of materials data may be analyzed to identify software attributes. For instance, data related to an author name, supplier name, component name, version string, component hash, unique identifier, relationship, or the like, may be extracted from the SBOM. In addition, the software analysis computing platform may receive author data. The author data may be received from, for instance, open source intelligence systems (e.g., via external entity computing system 150 and/or external entity computing system 155), from one or more vendor systems, or the like.

The author data may be analyzed using, for instance, natural language processing and/or machine learning to identify one or more author attributes. For instance, based on natural language processing and/or one or more clustering and categorization processes, author attributes such as country of origin, size of company authoring the software, product reliability, vulnerability history, support availability, affiliations, and/or other risk factors may be identified from the author data. In some examples, identified author data may be correlated to software attributes.

In some arrangements, current event data may be received by the software analysis computing platform 110 (e.g., from one or more external entity computing systems 150, 155). For instance, data related to current vulnerabilities (e.g., publicly available threat or cybersecurity intelligence data (e.g., open source intelligence), cybersecurity threat or intelligence data from one or more data services (e.g. closed sources), or the like), current event data (e.g., current political climate in a country or region), and the like, may be received.

In some examples, the software attributes, author attributes, as well as any additional data may be used as inputs in a machine learning model. In some examples, the machine learning model may be trained using historical software data, vulnerability data, outcome of identified vulnerabilities, and the like. For instance, structured and/or unstructured data including historical data for one or more software products may be used to train the machine learning model. The model may be executed to generate one or more outputs and subsequent data may then be used to update and/or validate the machine learning model. Accordingly, accuracy of the machine learning model may continuously be improving.

In some examples, data related to author attributes and/or current event or vulnerability data may be received continuously or near-continuously. Accordingly, real-time evaluation of software products of the enterprise organization may be performed continuously or near-continuously in order to quickly and efficiently identify potential risk.

The machine learning model executed by the software analysis computing platform 110 may output a risk score or confidence level that the software product is not potentially malicious. In some examples, this score or confidence level may be compared to one or more thresholds to identify an alert to generate and transmit to one or more computing devices, such as internal entity computing device 140.

Internal entity computing system 120 may be or include one or more computing devices or systems (e.g., servers, server blades, or the like) and may execute and/or host one or more software applications or products that may be monitored by the software analysis computing platform 110. For instance, internal entity computing system 120 may host or execute one or more software applications or products that may be used during the normal course of business of the enterprise organization. Accordingly, alerts generated, high risk products identified, or the like, may be transmitted to one or more users associated with internal entity computing system 120 and/or applications or software associated therewith.

Internal entity computing device 140 may be or include one or more computing devices, such as laptop computing devices, desktop computing devices, tablet devices, mobile devices, or the like, that may be used by one or more employees or users associated with the enterprise organization. For instance, alerts identifying potential risk associated with one or more software applications or products may be transmitted to the internal entity computing device 140 and may be displayed by a display of internal entity computing device 140.

External entity computing system 150 and/or external entity computing system 155, may be or include one or more computing systems or devices (e.g., servers, server blades, or the like) that may be associated with an entity other than the enterprise organization. External entity computing system 150 and/or external entity computing system 155 may provide SBOM data, current event data, current vulnerability data, author data, and the like. In some examples, the data received from one or more of external entity computing system 150 and/or external entity computing system 155 may be publicly available data. Additionally or alternatively, the data may be received as part of a service, via the purchase of a software application or product, or the like. As discussed herein, in some examples, data may be received from one or more of external entity computing system 150 and/or external entity computing system 155 continuously or near-continuously in order to enable accurate, real-time or near real-time analysis of software applications and/or products.

User computing device 170 may be or include one or more computing devices, such as laptop devices, desktop devices, tablet devices, smart phones, or the like, that may be associated with a user and used to display one or more alerts that may be transmitted. For instance, an employee of enterprise organization may receive an alert via his or her mobile device.

As mentioned above, computing environment 100 also may include one or more networks, which may interconnect one or more of software analysis computing platform 110, internal entity computing system 120, internal entity computing device 140, external entity computing system 150, external entity computing system 155, and/or user computing device 170. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, software analysis computing platform 110, internal entity computing system 120, and/or internal entity computing device 140, may be associated with an enterprise organization (e.g., a financial institution), and private network 190 may be associated with and/or operated by the organization, and may include one or more networks (e.g., LANs, WANs, virtual private networks (VPNs), or the like) that interconnect software analysis computing platform 110, internal entity computing system 120, and/or internal entity computing device 140, and one or more other computing devices and/or computer systems that are used by, operated by, and/or otherwise associated with the organization. Public network 195 may connect private network 190 and/or one or more computing devices connected thereto (e.g., software analysis computing platform 110, internal entity computing system 120, and/or internal entity computing device 140) with one or more networks and/or computing devices that are not associated with the organization. For example, external entity computing system 150, external entity computing system 155, and/or user computing device 170, might not be associated with an organization that operates private network 190 (e.g., because external entity computing system 150, external entity computing system 155, and/or user computing device 170 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect external entity computing system 150, external entity computing system 155, and/or user computing device 170 to private network 190 and/or one or more computing devices connected thereto (e.g., software analysis computing platform 110, internal entity computing system 120, and/or internal entity computing device 140).

Referring to FIG. 1B, software analysis computing platform 110 may include one or more processors 111, memory 112, and communication interface 113. A data bus may interconnect processor(s) 111, memory 112, and communication interface 113. Communication interface 113 may be a network interface configured to support communication between software analysis computing platform 110 and one or more networks (e.g., private network 190, public network 195, or the like). Memory 112 may include one or more program modules having instructions that when executed by processor(s) 111 cause software analysis computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of software analysis computing platform 110 and/or by different computing devices that may form and/or otherwise make up software analysis computing platform 110.

For example, memory 112 may have, store and/or include software bill of materials (SBOM) analysis module 112a. SBOM analysis module 112a may store instructions and/or data that may cause or enable the software analysis computing platform 110 to receive SBOM data for one or more software applications, products, components or the like associated with the enterprise organization. The SBOM may include an inventory of a codebase including, for instance, open source components, license and version information, and the like. The SBOM may be analyzed and software attributes may be extracted. For instance, attributes such as author name, supplier name, component name, version string, component hash, unique identifier, relationship, and the like, may be extracted from the SBOM. These attributes may, in some examples, be correlated to author(s) of the software.

Software analysis computing platform 110 may further have, store and/or include author data analysis module 112b. Author data analysis module 112b may receive data from one or more sources (e.g., internal sources, external sources, and the like) and may analyze the data to identify one or more author attributes. In some examples, received data may include open source intelligence risk analysis data (e.g., received from, for instance, a vendor or publicly available source), open source author data, and the like. In some examples, natural language processing and/or clustering and categorization may be used to analyze the data received and identify one or more author attributes. Some example author attributes that may be identified may include country of origin, size of company, product reliability, vulnerability history, support availability, affiliations, and the like. These attributes may, in some examples, be correlated to one or more current events. In some examples, author data may be received continuously or near-continuously or on a pre-defined schedule. For instance, the system may request or receive author data, analyze the data (e.g., via screen scrape or the like) to identify changes in author data. Any detected change may prompt the system to execute one or more machine learning models to analyze risk associated the software application, product or component.

In some examples, author data available may be incomplete and author data may be inferred from other data received with the author data. For instance, a source or author of data may be made available the software may use one or more components for which the source is not known. Analyzing the author data using natural language processing and/or machine learning may aid in identifying components and identifying source or author data associated with each software component (e.g., via other data points such as an internet protocol address) rather than just the final software product to provide a more complete view of risk associated with the software.

Software analysis computing platform 110 may further have, store and/or include current data analysis module 112c. Current data analysis module 112c may store instructions and/or data that may cause or enable the software analysis computing platform 110 to receive, from one or more sources (e.g., open sources, closed sources, and the like), such as external entity computing system 150, external entity computing system 155, or the like, data related to current events, current software vulnerabilities or risk, and the like. In some examples, current event data may be continuously or near continuously received or received on a pre-determined schedule (e.g, periodic or a-periodic basis). In some examples, current event data may be received upon determination of a triggering event (e.g., a change in status). Current event data may, in some example, include published or publicly available common vulnerabilities and exposures (CVE) data, defensive cybersecurity techniques and relationships, cyber adversary techniques and tactics, and the like. In some examples, current event data may also include data related to internal usage (e.g., by the enterprise organization) of the software application, product or component. For instance, a number of users within the enterprise organization, a number of systems or devices executing software, or the like, may be received and used to determine the confidence or risk score.

Software analysis computing platform 110 may further have, store and/or include a machine learning engine 112*d* including one or more machine learning models. The one or more machine learning models may be trained using historical software data, vulnerability data and the like, and training the one or more machine learning models may be performed in a supervised (e.g., using labeled data) and/or unsupervised manner. The one or more machine learning models may receive, as inputs, software attributes, author attributes, current event data, and the like, and may output a risk score or confidence value indicating a level of risk associated with the software application, product or component being evaluated. In some examples, the one or more machine learning models may be executing to continuously or near continuously evaluate risk associated with a software application, product or component.

Software analysis computing platform 110 may further have, store and/or include a notification generation module 112*e*. Notification generation module 112*e* may store instructions and/or data that may cause or enable the software analysis computing platform 110 to, based on the output of the one or more machine learning models, generate and send one or more notifications to one or more computing devices, such as internal entity computing device 140. Sending the one or more notifications may include sending an instruction causing the computing device to display the notification on a display of the computing device. In some examples, the notification may include an indication of risk associated with the software application, product or component, recommendations for mitigation, vendors who should be notified, and the like. In some examples, the notification generation module 112*e* may use historical data to generate and display trend data, heat maps indicating risk areas, and the like. In some examples, notification generation module 112*e* may generate and display a dashboard providing a wholistic view of software vulnerabilities for open source and vendor software for an entire enterprise organization.

In some examples, notifications or alerts may be quickly generated (e.g., in real-time or near real-time) to provide current risk status (e.g., based on analysis performed using real-time current event data) and provide work flow or other mitigating actions. For instance, notifications or alerts may include one or more recommended actions to mitigate risk.

Software analysis computing platform 110 may further have, store and/or include one or more databases 112*f*.

Database 112*f* may store software analysis data (e.g., outputs of previous analysis), trend data, and the like.

FIGS. 2A-2E depict one example illustrative event sequence for implementing software analysis functions in accordance with one or more aspects described herein. The events shown in the illustrative event sequence are merely one example sequence and additional events may be added, or events may be omitted, without departing from the invention. Further, one or more processes discussed with respect to FIGS. 2A-2E may be performed in real-time or near real-time.

Figure 2A:
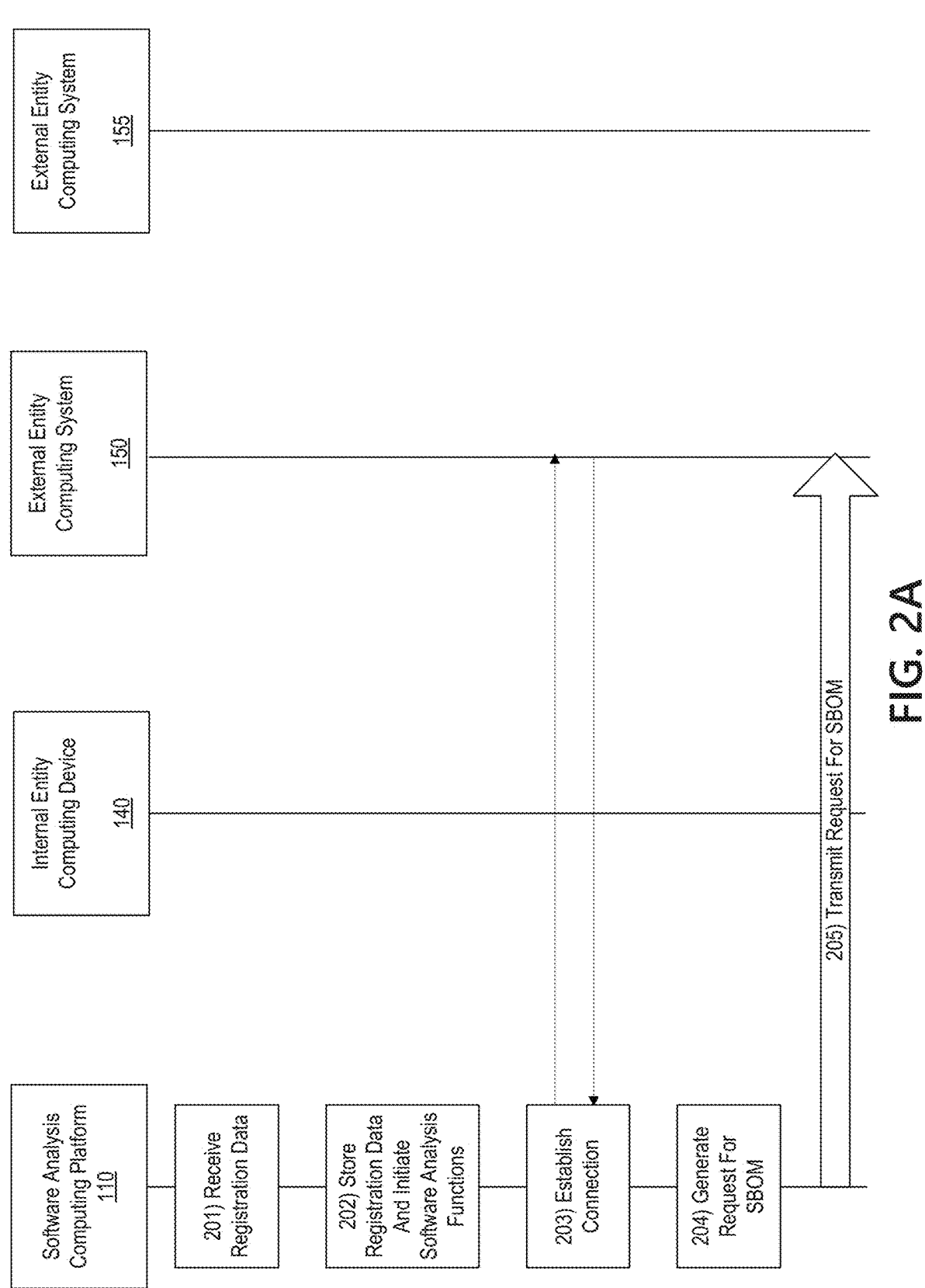
FIGS. 2A-2E depict an illustrative event sequence for implementing software monitoring and analysis functions in accordance with one or more aspects described herein.

With reference to FIG. 2A, at step 201, software analysis computing platform 110 may receive registration data. For instance, software analysis computing platform 110 may receive registration data including identification of one or more software applications, products, components, or the like, that will be monitored using one or more arrangements described herein. In some examples, the registration data may include details related to type of software, associated hardware, users, and the like.

At step 202, the software analysis computing platform 110 may store the registration data and initiate one or more software monitoring and analysis functions.

At step 203, software analysis computing platform 110 may connect to an external entity system, such as external entity computing system 150 which, may, for instance, store software bill of materials data. For instance, a first wireless connection may be established between software analysis computing platform 110 and the external entity computing system 150. Upon establishing the first wireless connection, a communication session may be initiated between external entity computing system 150 and software analysis computing platform 110.

At step 204, a request for software bill of materials (SBOM) data may be generated. For instance, a request for SBOM data may be generated for one or more software applications, products, components, or the like, that were registered with software analysis computing platform 110 (e.g., at step 201).

At step 205, software analysis computing platform 110 may transmit the generated request for SBOM data to, for instance, external entity computing system 150. For instance, the request for SBOM data may be transmitted during the communication session initiated upon establishing the first wireless connection.

Figure 2B:
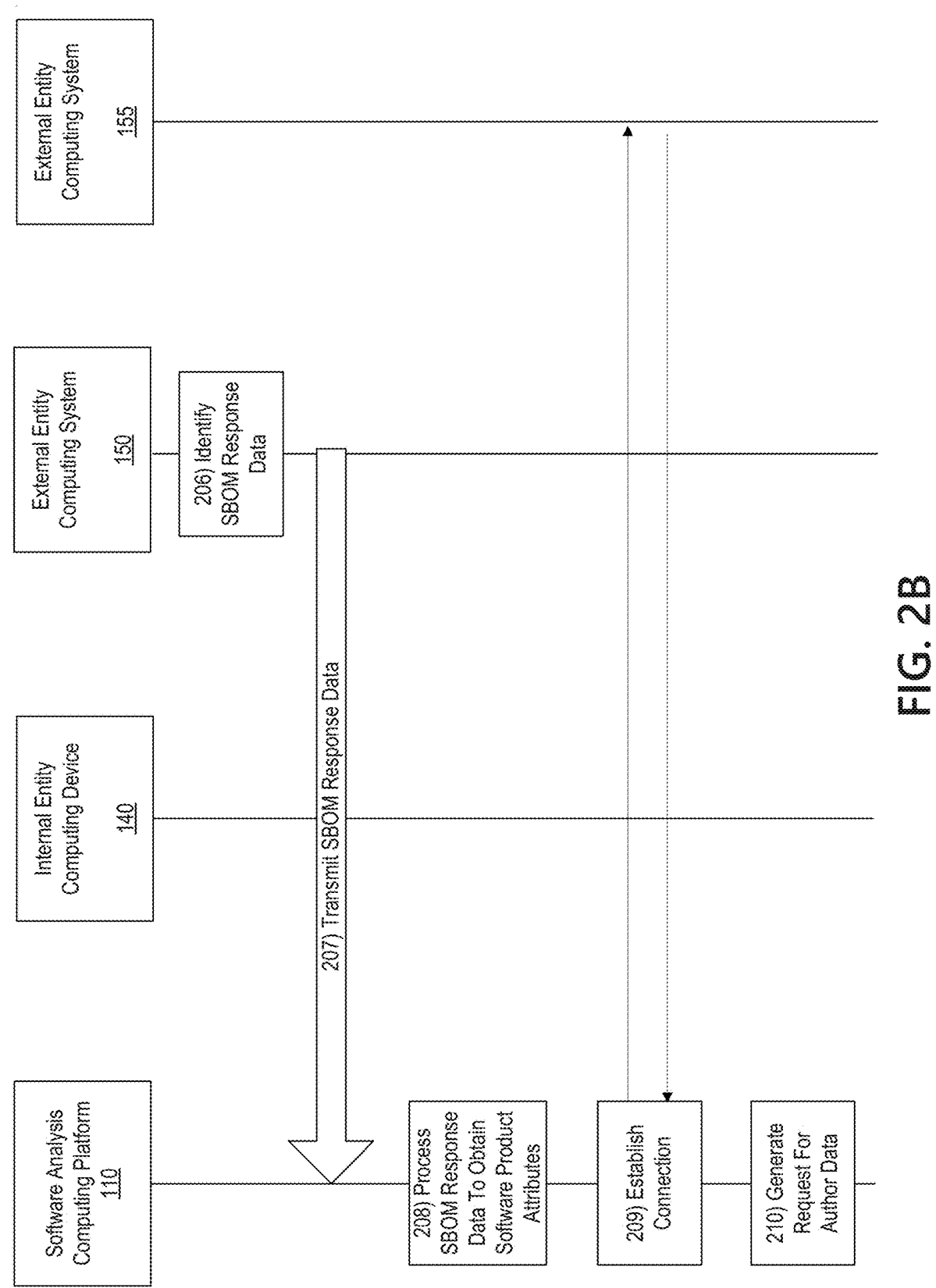

With reference to FIG. 2B, at step 206, external entity computing system 150 may receive the request for SBOM data and identify SBOM response data. For instance, external entity computing system 150 may identify, based on the request for SBOM data, SBOM data associated with one or more software applications, products, components, or the like, responsive to the request.

At step 207, the external entity computing system 150 may transmit the SBOM response data to the software analysis computing platform 110. For instance, the SBOM response data may be transmitted during the communication session initiated upon establishing the first wireless connection. Alternatively, an additional communication session may be initiated.

At step 208, the software analysis computing platform 110 may receive the SBOM response data and analyze the data to extract software attributes. For instance, attributes such as author name, supplier name, component name, version string, component hash, unique identifier, relationship, and the like, may be extracted from the SBOM response data.

At step 209, software analysis computing platform 110 may connect to an external entity system, such as external entity computing system 155 which, may, for instance, store author data. For instance, a second wireless connection may be established between software analysis computing platform 110 and the external entity computing system 155. Upon establishing the second wireless connection, a communication session may be initiated between external entity computing system 155 and software analysis computing platform 110.

Although the arrangements discussed herein describe author data stored at a different external entity computing system than SBOM data, in some examples, the data may be stored at a same external entity computing system. Additionally or alternatively, other external entity computing systems may be included and accessed to retrieve additional data (e.g., additional SBOM data, additional author data, additional current event data, or the like).

At step 210, software analysis computing system 110 may generate a request for author data. For instance, based on an author name extracted from the SBOM response data, a request for additional author data may be generated.

Figure 2C:
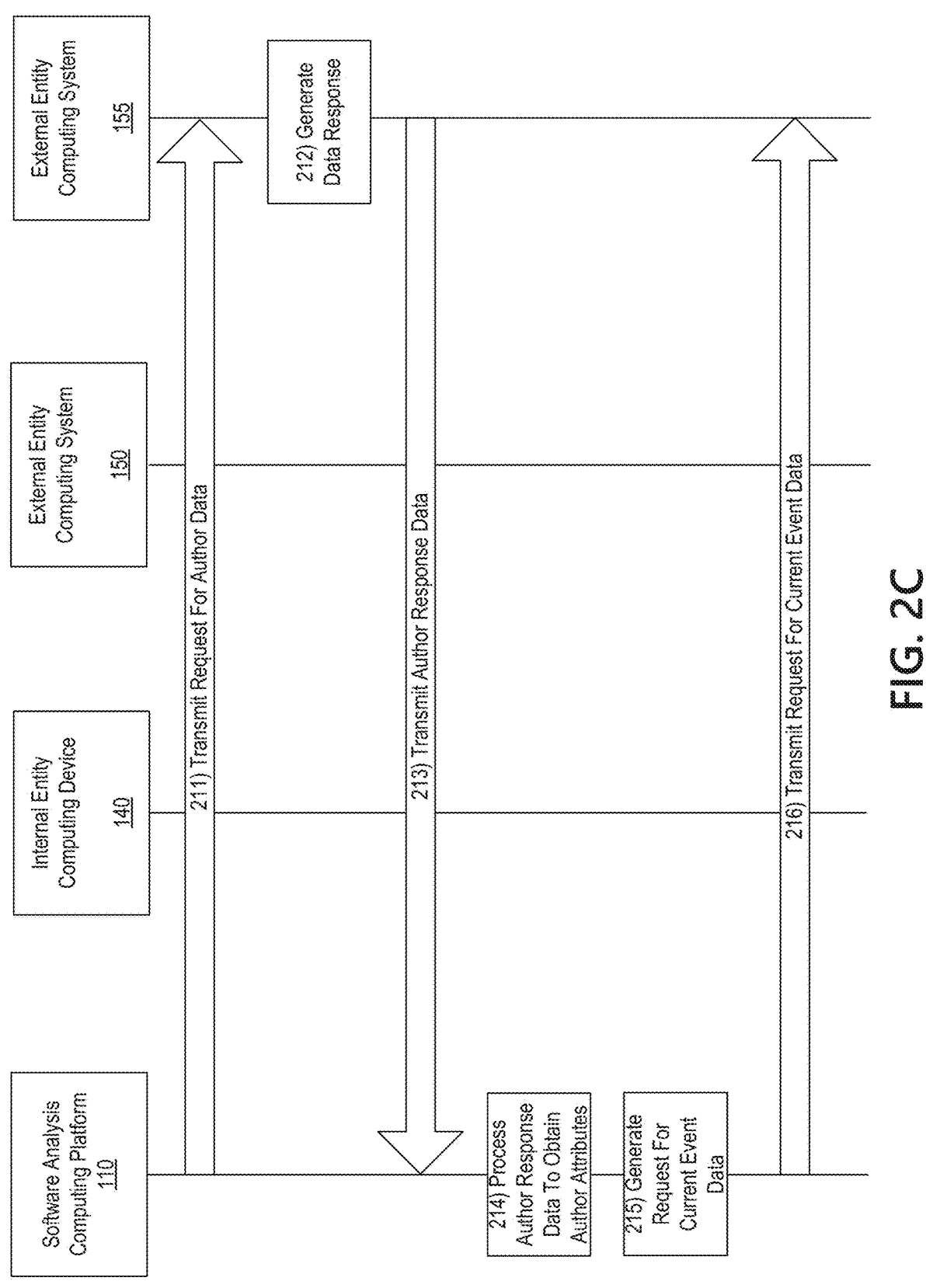

With reference to FIG. 2C, at step 211, the generated request for author data may be transmitted to external entity computing system 155. For instance, the request for author data may be transmitted during the communication session initiated upon establishing the second wireless connection. Further, although the request for author data is shown as being transmitted to one external entity computing system 155, in some examples, the request may be transmitted to multiple systems, devices, or the like.

At step 212, external entity computing system 155 may receive the request for author data and may generate author response data. For instance, data related to the author may be identified and compiled for sending in response to the request for author data.

At step 213, the external entity computing system 155 may transmit the author response data to the software analysis computing platform 110. For instance, the author response data may be transmitted during the communication session initiated upon establishing the second wireless connection. In some examples, the author response data may be continuously or near-continuously transmitted such that current data may be received and analyzed in real-time or near real-time. Additionally or alternatively, data may be transmitted on a periodic or a-periodic basis.

At step 214, the software analysis computing platform 110 may receive the author response data and analyze the data to identify one or more author attributes. For instance, natural language processing, machine learning (e.g., clustering and categorization), and the like, may be used to analyze the author response data and identify one or more author attributes. For instance, attributes such as country of origin, size of company, product reliability, vulnerability history, support availability, affiliations, and the like, may be identified based on the natural language processing and/or machine learning evaluation of the author response data.

At step 215, a request for current event data may be generated by the software analysis computing platform 110. For instance, a request for current vulnerability data, open source intelligence data, and the like, may be generated.

At step 216, the request for current event data may be transmitted to external entity computing system 155. Although the request for current event data is shown as being transmitted to a same external entity computing system 155 from which author data was received, in some examples, the request for current event data may be transmitted to another external entity computing system or more than one external entity computing system without departing from the invention.

Figure 2D:
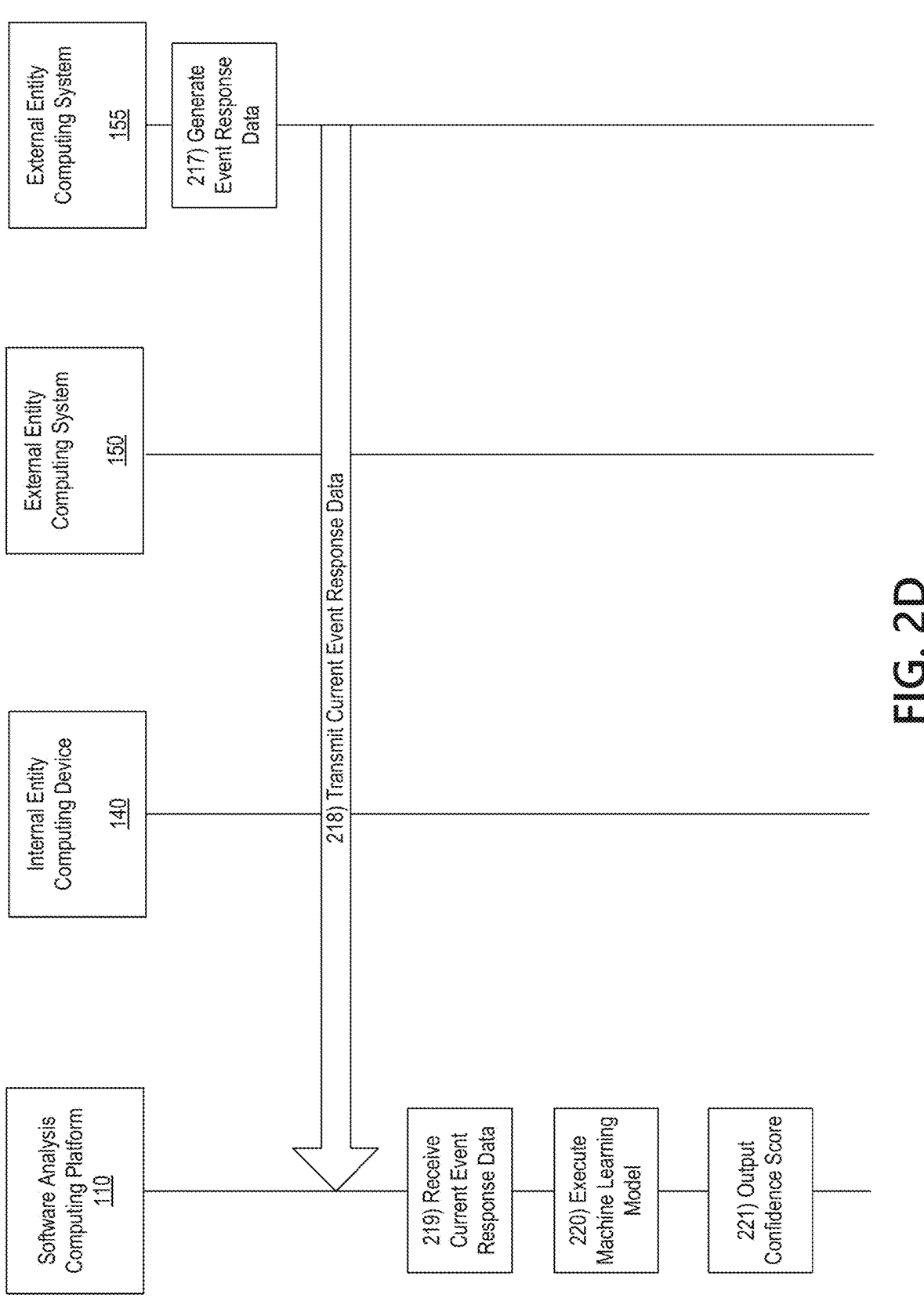

With reference to FIG. 2D, at step 217, external entity computing system 155 may generate current event response data. For instance, external entity computing system 155 may identify event data responsive to the request and generate current event response data.

At step 218, external entity computing system 155 may transmit the current event response data to the software analysis computing platform 110. In some examples, the current event response data may be continuously or near-continuously transmitted such that current data may be received and analyzed in real-time or near real-time. Additionally or alternatively, current event response data may be transmitted on a periodic or a-periodic basis, in response to a triggering event, or the like.

At step 219, software analysis computing platform 110 may receive the current event response data.

At step 220, one or more machine learning models may be executed. For instance, the software attributes, author attributes and current event data may be input into one or more machine learning models that may be executed to generate or output a confidence score or risk score associated with the software application, product, component, or the like, being evaluated, in step 221. The confidence score or risk score may indicate a likelihood of a vulnerability occurring in the software application, product, component, or the like, may indicate a level of risk associated with continued use of the software application, product, component, or the like, and the like. In some examples, the one or more machine learning models may be continuously or near-continuously executed on one or more software applications, products, components, or the like, in order to continuously or near-continuously (e.g., in real-time or near real-time) analyze and monitor risk associated with the software applications, products, components, or the like, being evaluated. Additionally or alternatively, the machine learning models may be executed (e.g., analysis performed) on a periodic or a-periodic basis (e.g., once per day, once per eight hour period, upon detection of a triggering event, or the like). Accordingly, as new data is received (e.g., continuously received current event data) the software application, product, component or the like may be evaluated to determine whether risk has changed, or the like.

Figure 2E:
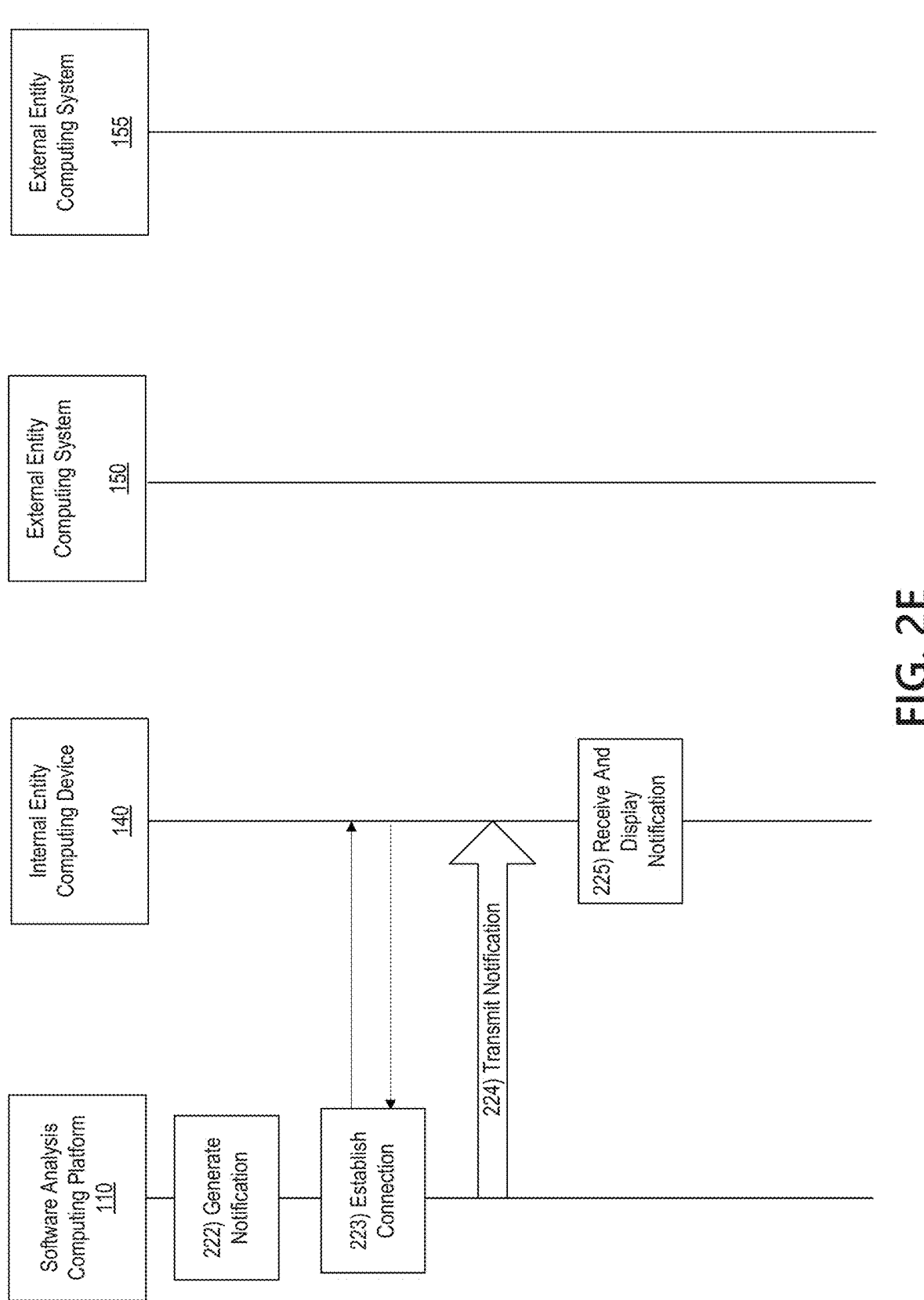

With reference to FIG. 2E, at step 222, software analysis computing platform 110 may generate one or more notifications. For instance, based on the determined confidence score or risk score, one or more notifications may be generated.

At step 223, software analysis computing platform 110 may connect to internal entity computing device 140. For instance, a third wireless connection may be established between software analysis computing platform 110 and the internal entity computing device 140. Upon establishing the third wireless connection, a communication session may be initiated between internal entity computing device 140 and software analysis computing platform 110.

At step 224, the software analysis computing platform 110 may transmit the generated notification to the internal entity computing device 140. In some examples, transmitting the notification may include transmitting a command or instruction causing the notification to be displayed by a display of the internal entity computing device 140.

At step 225, internal entity computing device 140 may receive the notification and may display the notification on a display of the internal entity computing device.

Figure 3:
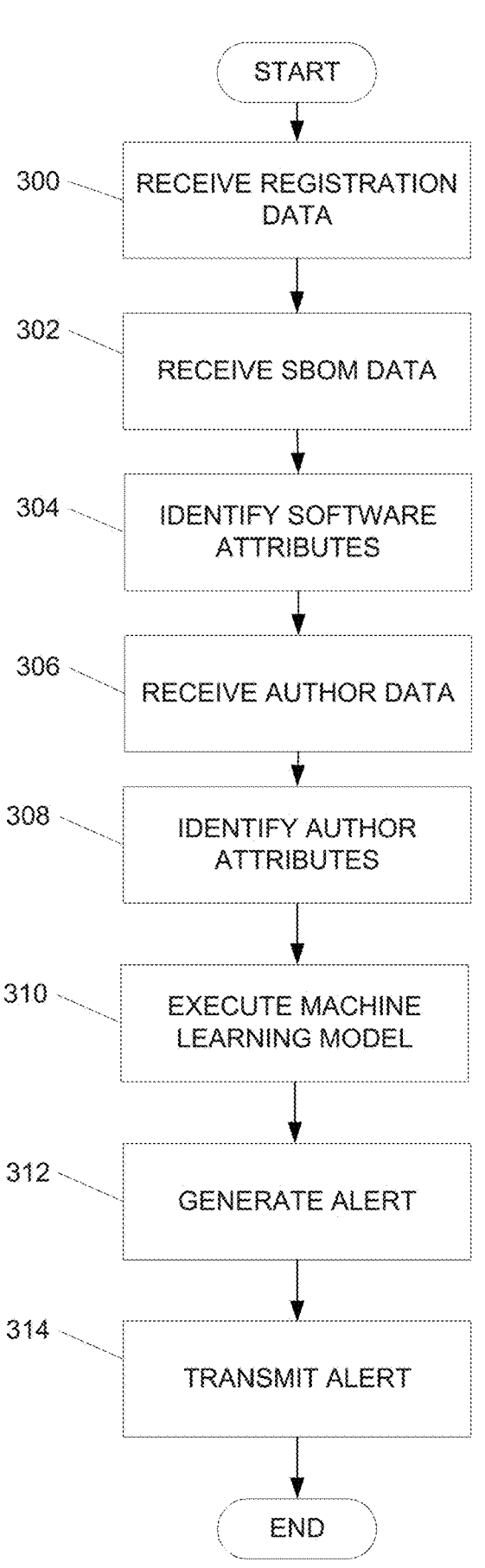
FIG. 3 illustrates an illustrative method for implementing software monitoring and analysis functions according to one or more aspects described herein.

FIG. 3 is a flow chart illustrating one example method of implementing software analysis and monitoring functions in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, registration data may be received by, for instance, a computing platform. In some examples, registration data may include identification of one or more software applications, products or components to be monitored and/or analyzed.

At step 302, software bill of materials data may be received. For instance, a software bill of materials including data associated with the one or more of the registered software applications, products or components may be received.

At step 304, the SBOM data may be analyzed and software attributes may be identified or extracted from the SBOM data.

At step 306, an author of one or more software applications, products or components may be identified and author data may be received. In some examples, the author data may be received from one or more sources. In some arrangements, author data may be received continuously to accurately assess the software application, product or component based on current or real-time data.

At step 308, the author data may be analyzed to determine or identify one or more author attributes. For instance, natural language processing and/or machine learning may be used to analyze the author data and identify one or more author attributes associated with the author of the software application, product or component being evaluated.

At step 310, one or more machine learning models may be executed. Executing the one or more machine learning models may include providing, as inputs, the software attributes, author attributes, and the like. The one or more machine learning models may output a confidence score or risk score indicative of a likelihood of risk associated with the software application, product or component.

At step 312, based on the confidence score or risk score output by the one or more machine learning models, an alert or notification may be generated. In some examples, the alert or notification may include the confidence score or risk score. In some examples, historical data may be retrieved and provided in the alert or notification (e.g., to illustrate trends, provide a heat map of areas of concern, or the like). In some examples, the alert or notification may include information related to recommended mitigating actions. Further, in some arrangements, the confidence score or risk score may be compared to one or more thresholds to determine a type of alert or notification, recipients of an alert or notification, data to provide in an alert or notification, and/or recommended mitigating actions. For instance, if the confidence or risk score is at or above a first threshold, a first type of alert may be generated with first data and sent to first recipients. If the confidence score or risk score is below the threshold, a second type of alert may be generated and transmitted to second recipients. More than one threshold and other variations of information provided in an alert may be used without departing from the invention.

At step 314, the generated alert or notification may be transmitted to a user computing device. In some examples, transmitting the alert or notification to the user computing device may cause the user computing device to display the alert or notification on a display of the user computing device. For instance, FIG. 4 illustrates one example alert or notification 400 that may be generated, transmitted and displayed.

As discussed, aspects described herein are directed to receiving SBOM data, author data and current event data to continuously or near-continuously analyze and monitor software applications, products or components to understand risk, vulnerabilities, and the like. Aspects described herein may be used to analyze and monitor open source software, vendor or commercially purchased software, internally developed software, or the like.

Further, in some examples, aspects described herein may identify software products or components that are forked from another software package, thereby providing more accurate risk assessment for a software application, product or component.

In some examples, attributes identified may be based on a source of the software. For instance, attributes identified for open source software may be different from (or include at least one attribute different from) attributes identified for vendor software.

In some examples, generating one or more alerts or notifications may include automatically feeding an analysis output into a database or trusted sources. For instance, an output from one or more machine learning models may be automatically fed into a database storing trusted source information. In some examples, the confidence or risk score may be provided to quickly identify trusted or untrusted sources.

In some examples, data associated with alerts transmitted, risks identified, and the like, may be fed back into the one or more machine learning models to update or validate the one or more machine learning models in order to continuously improve accuracy. Further, in some examples, a source, author, vendor, or the like, previously associated with an identified risk may be used to prioritize analysis of software applications, products, components, or the like, associated with that source, author, vendor, or the like. For instance, if a software product is identified as high risk or low confidence in security of the product, an author or source or that product may be identified and analysis associated with future products associated with that author or source may be prioritized for analysis and/or monitoring. In some examples, a user may manually trigger execution of the one or more machine learning models in order to analyze a software application, product or component.

Figure 5:
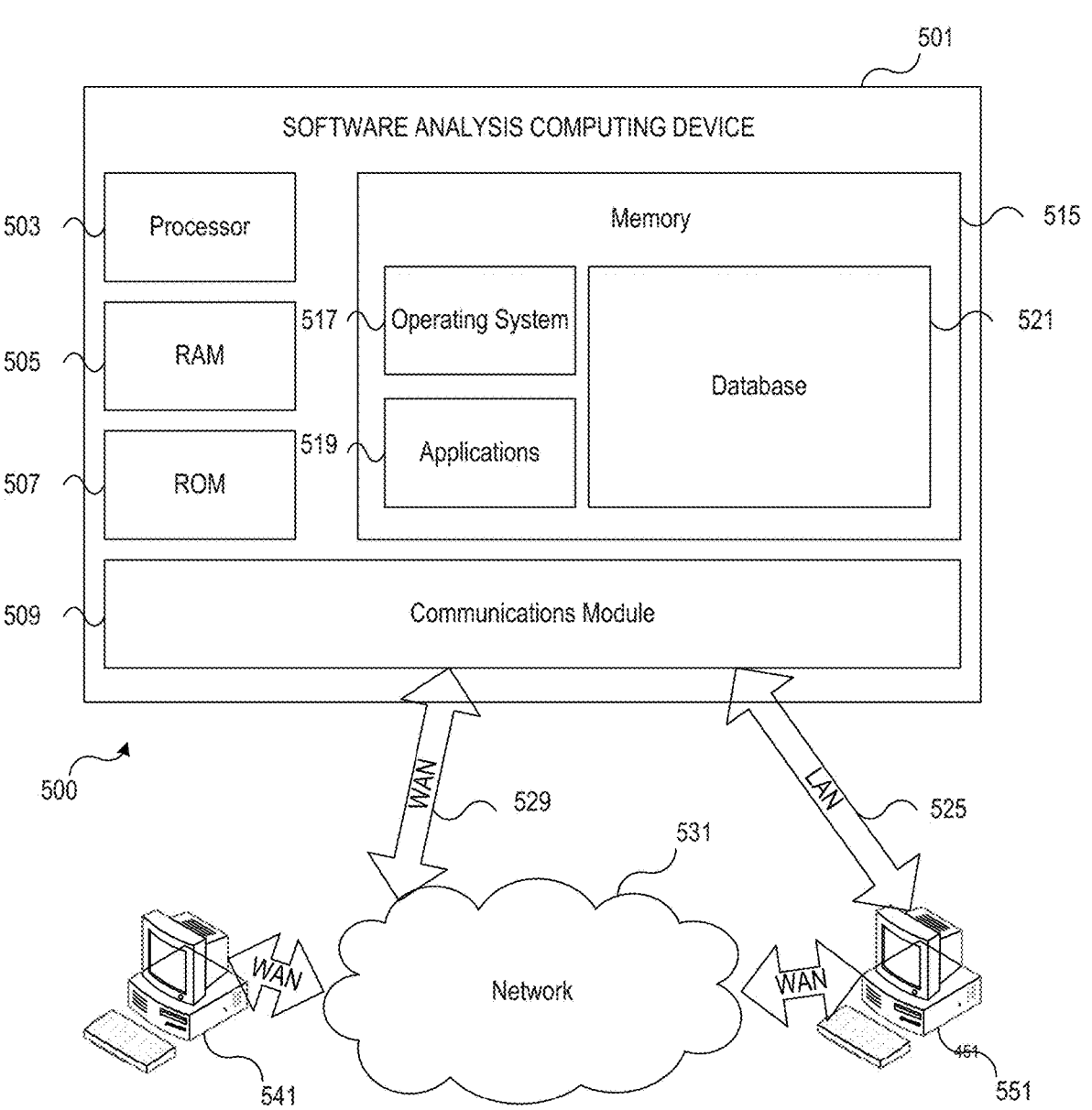
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include software analysis computing device 501 having processor 503 for controlling overall operation of software analysis computing device 501 and its associated components, including Random Access Memory (RAM) 505, Read-Only Memory (ROM) 507, communications module 509, and memory 515. Software analysis computing device 501 may include a variety of computer readable media. Computer readable media may be any available media that may be accessed by software analysis computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by software analysis computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on software analysis computing device 501. Such a processor may execute computer-executable instructions stored on a computer-readable medium.

Software may be stored within memory 515 and/or storage to provide instructions to processor 503 for enabling software analysis computing device 501 to perform various functions as discussed herein. For example, memory 515 may store software used by software analysis computing device 501, such as operating system 517, application programs 519, and associated database 521. Also, some or all of the computer executable instructions for software analysis computing device 501 may be embodied in hardware or firmware. Although not shown, RAM 505 may include one or more applications representing the application data stored in RAM 505 while software analysis computing device 501 is on and corresponding software applications (e.g., software tasks) are running on software analysis computing device 501.

Communications module 509 may include a microphone, keypad, touch screen, and/or stylus through which a user of software analysis computing device 501 may provide input, and may also include one or more of a speaker for providing audio output and a video display device for providing textual, audiovisual and/or graphical output. Computing system environment 500 may also include optical scanners (not shown).

Software analysis computing device 501 may operate in a networked environment supporting connections to one or more remote computing devices, such as computing devices 541 and 551. Computing devices 541 and 551 may be personal computing devices or servers that include any or all of the elements described above relative to software analysis computing device 501.

The network connections depicted in FIG. 5 may include Local Area Network (LAN) 525 and Wide Area Network (WAN) 529, as well as other networks. When used in a LAN networking environment, software analysis computing device 501 may be connected to LAN 525 through a network interface or adapter in communications module 509. When used in a WAN networking environment, software analysis computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
at least one processor;
a communication interface communicatively coupled to the at least one processor; and
a memory storing computer-readable instructions that, when executed by the at least one processor, cause the computing platform to:
  receive, for a first software product, software bill of materials data;
  extract, from the software bill of materials data, software attributes for the first software product, the software attributes for the first software product including at least an author of the first software product;
  receive, from one or more sources, author data associated with the author of the first software product;
  execute a natural language processing function on the author data to determine one or more author attributes;
  execute a machine learning model to determine a confidence score associated with the first software product, wherein the machine learning model uses as inputs the software attributes of the first software product and the determined one or more author attributes;
  generate, based on the confidence score associated with the first software product, an alert; and
  transmit, to an enterprise organization computing device, the generated alert, wherein transmitting the alert causes the alert to be displayed on a display of the enterprise organization computing device.

2. The computing platform of claim 1, wherein the first software product is an open source software product.

3. The computing platform of claim 1, wherein the one or more sources include open source intelligence sources.

4. The computing platform of claim 1, the instructions further including:
receive current event data,
wherein the machine learning model further uses as inputs the received current event data.

5. The computing platform of claim 4, wherein the current event data is continuously received.

6. The computing platform of claim 1, wherein the author data is continuously received.

7. The computing platform of claim 1, the instructions further including:
execute a machine learning process on the author data to determine the one or more author attributes.

8. The computing platform of claim 7, wherein the machine learning process includes at least one of: a clustering process or a categorization process.

9. A method, comprising:
receiving, by a computing platform, the computing platform having at least one processor, and memory, and for a first software product, software bill of materials data;
extracting, by the at least one processor and from the software bill of materials data, software attributes for the first software product, the software attributes for the first software product including at least an author of the first software product;
receiving, by the at least one processor and from one or more sources, author data associated with the author of the first software product;
executing, by the at least one processor, a natural language processing function on the author data to determine one or more author attributes;
executing, by the at least one processor, a machine learning model to determine a confidence score associated with the first software product, wherein the machine learning model uses as inputs the software attributes of the first software product and the determined one or more author attributes;
generating, by the at least one processor and based on the confidence score associated with the first software product, an alert; and
transmitting, by the at least one processor and to an enterprise organization computing device, the generated alert, wherein transmitting the alert causes the alert to be displayed on a display of the enterprise organization computing device.

10. The method of claim 9, wherein the first software product is an open source software product.

11. The method of claim 9, wherein the one or more sources include open source intelligence sources.

12. The method of claim 9, further including:
receiving, by the at least one processor, current event data,
wherein the machine learning model further uses as inputs the received current event data.

13. The method of claim 12, wherein the current event data is continuously received.

14. The method of claim 9, further including:
executing, by the at least one processor, a machine learning process on the author data to determine the one or more author attributes.

15. The method of claim 14, wherein the machine learning process includes at least one of: a clustering process or a categorization process.

16. One or more non-transitory computer-readable media storing instructions that, when executed by a computing platform comprising at least one processor, memory, and a communication interface, cause the computing platform to:

receive, for a first software product, software bill of materials data;

extract, from the software bill of materials data, software attributes for the first software product, the software attributes for the first software product including at least an author of the first software product;

receive, from one or more sources, author data associated with the author of the first software product;

execute a natural language processing function on the author data to determine one or more author attributes;

execute a machine learning model to determine a confidence score associated with the first software product, wherein the machine learning model uses as inputs the software attributes of the first software product and the determined one or more author attributes;

generate, based on the confidence score associated with the first software product, an alert; and transmit, to an enterprise organization computing device, the generated alert, wherein transmitting the alert causes the alert to be displayed on a display of the enterprise organization computing device.

17. The one or more non-transitory computer-readable media of claim 16, wherein the first software product is an open source software product.

18. The one or more non-transitory computer-readable media of claim 16, wherein the one or more sources include open source intelligence sources.

19. The one or more non-transitory computer-readable media of claim 16, the instructions further including:

receive current event data, wherein the machine learning model further uses as inputs the received current event data.

20. The one or more non-transitory computer-readable media of claim 16, the instructions further including:

execute a machine learning process on the author data to determine the one or more author attributes.

* * * * *